United States Patent [19]

Thiebault

[11] 4,363,682

[45] Dec. 14, 1982

[54] PROCESS FOR THE SUPERFICIAL TREATMENT OF A FIBROUS FILTERING LAYER, WHICH IS NON-WOVEN AND HIGHLY AERATED, FORMING ELECTRET

[75] Inventor: Bernard Thiebault, Montmorency, France

[73] Assignee: Seplast, Gennevilliers, France

[21] Appl. No.: 251,077

[22] Filed: Apr. 6, 1981

[30] Foreign Application Priority Data

Apr. 18, 1980 [FR] France ............................... 80 08810

[51] Int. Cl.³ .......................... B29H 9/04; D04H 3/08
[52] U.S. Cl. .................................... 156/181; 156/296; 156/555; 428/218; 428/296
[58] Field of Search ...................... 156/62.2, 62.8, 296, 156/181, 555; 428/218, 296

[56] References Cited

U.S. PATENT DOCUMENTS

| | | | |
|---|---|---|---|
| 3,652,377 | 3/1972 | Helmick | 428/218 |
| 3,936,337 | 2/1976 | Stapp | 156/181 |
| 3,953,974 | 5/1976 | Bresson et al. | 428/296 |
| 4,093,763 | 6/1978 | Hartman | 428/296 |
| 4,129,675 | 12/1978 | Scott | 428/296 |
| 4,178,157 | 12/1979 | Turnhout | 264/22 |
| 4,215,682 | 8/1980 | Kubik et al. | 264/22 |

FOREIGN PATENT DOCUMENTS 2249138  4/1974  Fed. Rep. of Germany .

Primary Examiner—Jerome W. Massie
Attorney, Agent, or Firm—Bacon & Thomas

[57] ABSTRACT

The process of the invention consists in smoothing the or each fluffy surface of the layer by exerting a slight friction under low pressure so that the projecting fibers are flattened on the subjacent fibrous mass without the latter being compressed, the friction being exerted at a softening temperature such that the superficial fibers are welded together to form a skin or porous glaze. The smoothing is preferably effected by means of a metal mass whose temperature is between 115° and 150° C. This process may be applied to the outer face of a filtering breathing mask constituted by an envelope made of this fibrous material covering a relatively rigid porous shell for protection of the skin; it may also be applied to at least one of the faces of filtering layers equipping filters of any type.

6 Claims, 5 Drawing Figures

PROCESS FOR THE SUPERFICIAL TREATMENT OF A FIBROUS FILTERING LAYER, WHICH IS NON-WOVEN AND HIGHLY AERATED, FORMING ELECTRET

The present invention relates to a process for the superficial treatment of a fibrous filtering layer, which is non-woven and highly aerated, forming electret and to its application to filters and to breathing masks in particular.

For the filtration of air, materials based on dielectric fibres, combined to form a non-woven, highly aerated layer and forming an electret, are exceptionally efficient and advantageous due to their neutral or provoked electrostatic action.

It will be recalled for memory that a dielectric is a body inside which an electric field may be established without loss of energy and which consequently does not conduct the current. An electret is then a dielectric which remains electrified permanently after having been subjected to a temporary electric field.

Such a material is described in French patent application No. 2 374 939. The material which is manufactured by the Applicant, Verto, for this use is based on polypropylene fibres and has been the subject of the tests set forth hereinafter for demonstrating the characteristics and advantageous results of the invention.

The above-mentioned filtering layer has multiple applications, and more particularly, the constitution of filters, the manufacture of breathing masks, etc.

In the filters, the layers are housed in a box, bag or the like, suitable for the use to be made thereof.

In the breathing masks, the filtering layer is an envelope applied against a porous, relatively rigid inner shell adapted to the face, this envelope being provided with an outer coating which is also porous.

In fact, it is impossible to use these non-woven fabrics without a superficial protection, as they shed fluff, which makes the masks unpleasant to wear and unattractive in appearance.

Fluff is also shed in the filters and the positioning of the layers is rendered delicate, long, imperfect and unpleasant for the personnel in charge of this operation obliging porous films to be placed on the two faces.

More particularly, as far as the known masks are concerned, the preformed, relatively rigid inner shell is necessary as the filtering layer has no mechanical strength and no rigidity; an outer protection is also necessary, not only to improve the appearance and render handling pleasant, but also to avoid the fibres escaping and being suspended in the ambient air. On the other hand, the filtering layer, even if it is provided with a conventional outer coating, cannot be unclogged as it traps the filtered particles and keeps them prisoner. Furthermore, the effect of the known superficial protections is to increase the depression of the gaseous flow passing through the filtering layer, all the more so as clogging occurs and accentuates.

It is an object of the present invention to remove the fluffy surface appearance from the filtering layer and to form, without any addition, a porous skin which can be unclogged and which does not increase the depression so that, if the layer constitutes a mask, it is comfortable and pleasant to wear and the wearer can breathe without any hindrance. Subsidiarily, this integrated porous skin must produce a filtration by surface effect improving the filtration obtained in the layer by electrostatic effect.

To this end, and according to the process of the invention, the or each fluffy surface of said layer is smoothed by exerting a light friction under low pressure so that the projecting fibres are smoothed down on the subjacent fibrous mass without the latter being compressed, the friction being exerted at a softening temperature such that the superficial fibres are welded to one another to form a skin or porous glaze.

Smoothing is preferably effected by means of a metal mass of which the temperature is between 115° and 150° C. The relative speed of advance between the crude filtering layer and the heating mass, the pressure applied therebetween and the duration of contact are determined as a function of the supply of heat to produce a partial self-adhesive fusion of the surface fibres on smoothing them, but avoiding this effect propagating in the mass.

The invention will be more readily understood on reading the following description with reference to the accompanying drawings, in which.

Figures 2, 3:
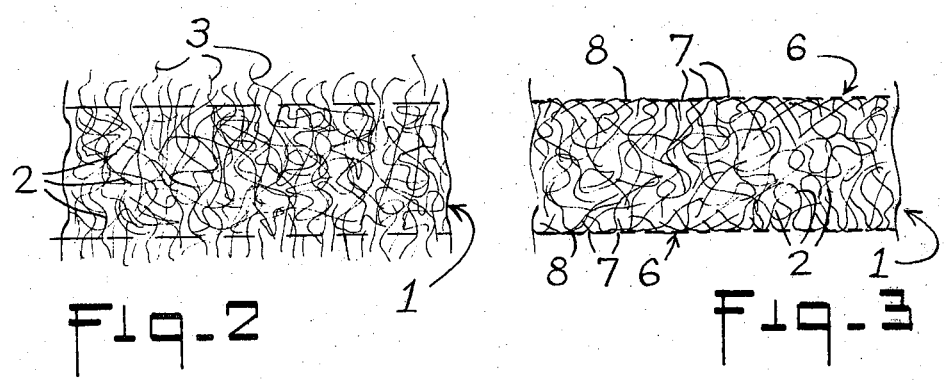
FIGS. 2 and 3 are sections showing, to a large scale, a filtering layer as used heretofore, as manufactured, and as it is now, after treatment according to the invention, respectively.

Referring now to the drawings, FIG. 2 shows the filtering layer 1, defined hereinabove, which comprises dielectric fibres 2, preferably polypropylene, loosely intermingled to constitute a non-woven, highly aerated fabric and treated with a temporary electric field in order to become a durably efficient electret for filtering by the electrostatic effect. Of course, any fibres of any nature may be used as long as the electrostatic effect exists, whether it is natural or provoked. The fibres 2 project on the surface and give the layer 1 a fluffy appearance due to their emerging portions 3.

Figure 1:
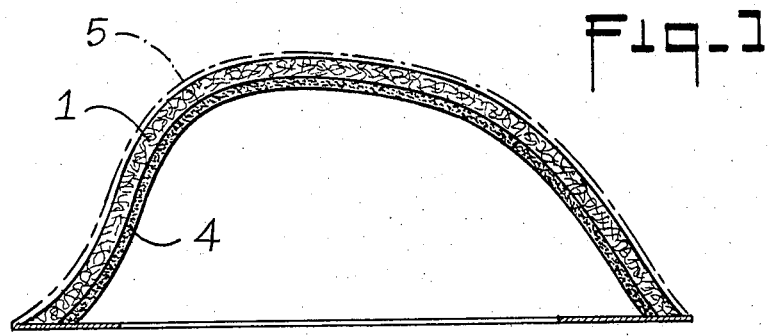
FIG. 1 is a schematic section through a breathing mask applying the process of the invention.

In the particular application shown by FIG. 1 and which concerns a breathing mask, said mask comprises a relatively rigid porous shell 4 adapted to the face. A layer 1 is fixed to this shell by gluing or any other equivalent means not detrimental to the porosity. The outer visible face of the layer 1 is fluffy and, to remedy the drawbacks set forth hereinabove, this face is covered with a likewise porous coating 5 which is defined by a dashed and dotted line since, although it exists in the prior art, it is an object of the invention to eliminate it.

To this end, the crude filtering layer 1 is replaced by a similar layer 6 treated superficially and illustrated in FIG. 3.

The treatment in question consists in smoothing the outer fluffy surface by exerting a light friction under low pressure in order to lay the emerging portions 3 of the fibres down at 7 on the subjacent fibrous mass. This friction may be applied at a softening temperature so that the flattened fibres 7 are welded on one another and with the fibres with which they are in contact in order to form, by this welded and flattened interlacing 8, a skin or porous glaze which is relatively smooth and exempt from fibres which brush up and are capable of being detached.

This result may easily be obtained with an iron, but is is obvious that, although this technique is suitable for tests, it cannot be applied homogeneously and profitably to industrial production.

However, it is possible to retain the teaching therefrom according to which smoothing may be effected by a heating metal mass of which the temperature is between 115° and 150° C.

If the fibres are made of polypropylene, it has been observed that, beneath 115° C., smoothing does not occur and, beyond 150° C., the fibres tend to melt and shrink; in addition, the electrostatic effect loses its efficiency.

Figure 4:
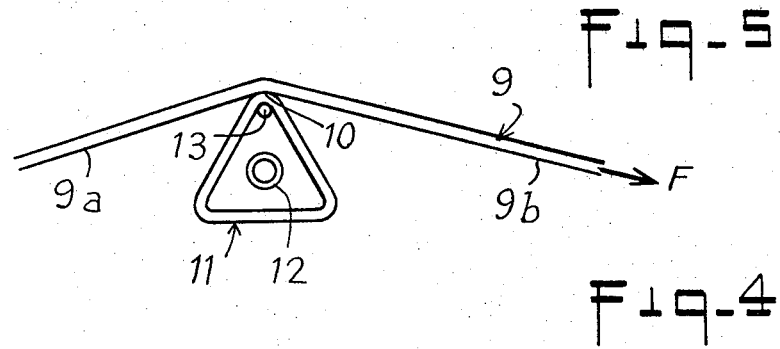

According to a first embodiment illustrated in FIG. 4, a strip 9 of filtering material is driven in continuous translation in the direction of arrow F by any suitable means and abuts by its face to be treated on the peak 10 of a heating mirror 11. In the example shown, this mirror is a polished metal tube of triangular section, coated with "Teflon" or other non-stick matter and containing an electric heating element 12 of which the temperature is stabilised due to a heat probe or an electronic regular 13 placed beneath the peak 10. Due to the support pressure and to the advance tension, the upstream side 9a and the downstream side 9a of the strip 9 forms a dihedron of which the edge coincides with the peak 10 of the heating mirror 11.

Figure 5:
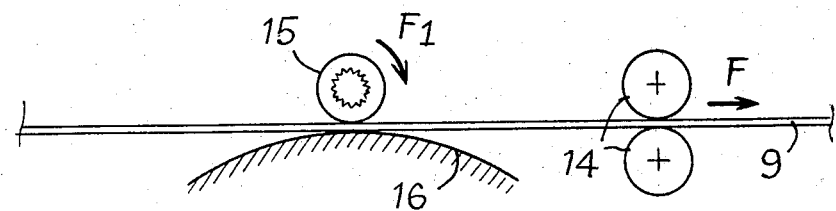
FIGS. 4 and 5 are schematic views illustrating two devices carrying out two different embodiments of the process of the invention.

According to a second embodiment illustrated schematically in FIG. 5, the strip 9 of filtering material is driven in continuous advance in the direction of arrow F by a calender 14 whose cylinders lightly compress the strip. Upstream, this strip circulates between a heating smoothing cylinder 15 and a subjacent support 16. In the example shown, the cylinder 15 rotates in the direction of arrow F1 opposite that of the advance and the arcuate support 16 is fixed, to produce the desired effect of smoothing and ironing.

Of course, the relative speed of advance between the crude filtering layer and the heating mass, the pressure applied therebetween and the duration of contact are determined as a function of the supply of heat for producing a partial self-adhesive fusion of the surface fibres on smoothing them, but avoiding this effect propagating in the mass. For example in the first embodiment (FIG. 4), the temperature of the heating mirror may be regulated at 137° C.±5° C., the speed of advance is then 6 m/min., the angle of the two sides 9a and 9b is 150° and the tension of the strip 9 of polypropylene fibres is 400 g for a strip width of 700 mm.

This treatment is applied to the lower face of the strip so that it constitutes the outer visible face of a breathing mask, the non-treated face being rendered fast with a porous shell 4.

Such a mask (1,4) possesses the properties set forth hereinabove, which properties are much more advantageous than those of the nearest known mask (1,4,5), as will be seen from the following table.

| | Mask made of "Verto" filter of 100 g/m² treated according to the process | Mask of "Verto" filter of 100 g/m² not treated and covered with a porous coating 5 |
|---|---|---|
| Depression of clogging (in mm of water column) | 3 | 3 |
| Weight of dust stopped when this depression is attained | 477 mg/dm² | 300 mg/dm² |
| Depression obtained after a first unclogging by striking | 0.6 mm | 1.2 mm |
| Depression obtained after a second unclogging | 0.6 mm | 1.4 mm |
| Depression obtained after a third unclogging | 0.6 mm | 1.48 mm |
| Depression obtained after a fourth unclogging | 0.6 mm | 1.52 mm |

This table clearly shows that, at equal depression, the mask of the invention stops much more dust than the prior art mask or that, at equal quantity of dust stopped, it is easier to breathe through the mask of the invention than through the prior art mask.

The table also shows that the mask of the invention is easily unclogged by striking it and that its filtering power as well as the ease of breathing through it are identical after each cleaning; on the contrary, with the prior art mask, it is less easy to breathe after each cleaning and the quantity of dust stopped decreases.

Of course, the two faces of the filtering layer may be treated, this rendering the use thereof much more convenient in filters, in particular.

The invention is not limited to the embodiments of the process shown and described in detail hereinabove, as various modifications may be made thereto without departing from its scope.

What is claimed is:

1. A process for superficially treating a highly aerated, fluffy, fibrous electret, air filtering fabric layer having fibers projecting above a subjacent mass, which comprises smoothing at least one fluffy surface of the layer by exerting a light friction under low pressure to flatten the projected fibers on the subjacent fiber mass without substantial compression of said mass, and at a softening temperature to weld the superficial fibers together and to form a skin or pourous glaze which will be unclogged and by a surface effect adds to the filtering power of the electrostatic filtering layer without reducing the gaseous flow passing through the layer.

2. The process of claim 1 wherein the smoothing is effected by means of a metal mass having a temperature is between 115° and 150° C.

3. The process of claim 1 wherein the fluffy filtering layer is advanced passed heating and friction means, the relative speed and the pressure applied therebetween and the duration of contact are determined as a function of the heat supplied to produce a partial self-adhesive fusion of the surface fibres while avoiding the propagation of this effect in the subjacent fibrous mass.

4. The process of claim 2, wherein the heating means is a heating mirror and the filtering layer advances abutting on the heating mirror.

5. The process of claim 2 wherein the filtering layer is driven by calender passes through a smoothing device comprising a subjacent fixed or rotary support and a heating cylinder producing a speed of tangential flattening of the projecting fibers of the layer, which speed is different from the speed of advance of said layer produced by the calender.

6. The process of claims 1, 2, 3, 4 or 5, wherein the filtering layer comprises polypropylene.

* * * * *